Feb. 8, 1966            N. B. LARSEN            3,234,045
METHOD FOR PROTECTING UNDERGROUND CABLE AND
DETERMINING LEAKS THEREIN
Filed May 5, 1961

INVENTOR.
NORMAN B. LARSEN

BY

ATTORNEY though, by United States Patent Office 3,234,045 Patented Feb. 8, 1966

3,234,045
METHOD FOR PROTECTING UNDERGROUND CABLE AND DETERMINING LEAKS THEREIN
Norman B. Larsen, Norristown, Pa., assignor, by mesne assignments, to Chas. J. Webb Sons Co., Inc., Philadelphia, Pa., a corporation of Pennsylvania
Filed May 5, 1961, Ser. No. 107,928
6 Claims. (Cl. 117—231)

This invention relates to a method for protecting underground cable and determining leaks therein, and more particularly to a method intended for use with communication-type cable in which a gas, such as dry nitrogen or dry air is continuously passed through a space within the cable.

In large communication cables, it is conventional practice to continuously pass a stream of dry inert gas, such as dry nitrogen or dry air through the cable under a super atmospheric pressure in order to dislodge moisture from the cable and prevent corrosion. Thus, at the present time, air is dehumidified by refrigeration units and passed through the cable under pressure. Vacuum pump means may be utilized at the downstream end of the cable to insure the constant flow of gas.

Mechanical breaks in the cable conduit, as well as the palatability of the insulation to ground animals, such as squirrels, chipmunks, etc. often cause considerable loss of the gas. Breaks in the conduit cause great expense, as the conduit is underground and allows for an influx of moisture.

Since the prime action of the gas passing through the cable is basically mechanical in nature, namely the mechanical displacement of moisture, even relatively small breaks give rise to serious consequences.

It is an object of the present invention to provide a novel method for protecting electrical cable installed underground.

This invention has as an object the provision of a method for providing a dielectric film to be deposited on exposed underground cable in order to prevent electrical leakage and discharge.

Another object of the present invention is the provision of a method for rapidly determining the location of leaks and mechanical breaks in underground cable.

A still further object of the present invention is a method for displacing moisture which may have entered into an underground cable.

Other objects will appear hereinafter.

For the purpose of illustrating the invention there is shown in the drawings a form which is presently preferred; it being understood, however, that this invention is not limited to the precise arrangements and instrumentalities shown.

The accompanying figure is a flow sheet of the process of the present invention.

These and other objects of the present invention are accomplished by the method of the present invention in which a gaseous stream containing finely divided aerosol particles is injected into the cable, either periodically or continuously, with the dry nitrogen or dry air or other gas being normally passed through the cable. The gaseous stream utilized in the method of the present invention comprises a vaporized solvent and finely divided aerosol particles containing a dielectric film forming material and a fluorescent dye.

The finely divided aerosol particles used in the gaseous stream in the method of the present invention should be of a size small enough to exhibit Brownian movement. This will enable such particles to move in the carrier gas stream for all practical purposes as a gas, and thus pass around corners, through bends and tortuous passageways.

The dielectric film forming material will deposit upon all exposed surfaces, and will serve to safeguard against electrical discharges and leakage. The presence of a fluorescent dye in the aerosol particles will enable facile detection of leaks to be accomplished. Thus, leaks may be readily determined by the passage of ultraviolet light (light having a wavelength of between about 400 and 4000 Angstrom units and preferably in the long wave ultraviolet light portion of the spectrum such as about 3600 Angstrom units) about the cable. A leak will be readily ascertainable by the characteristic fluorescence in the region of such leak.

The method of the present invention enables moisture displacement to be achieved since as in prior systems, there will be a continuous stream of gas going through the cable, which gaseous stream mechanically displaces moisture.

For economic reasons it may be desirable to pulsate the gaseous stream containing aerosol particles in the dry air or dry nitrogen gas stream normally passing through the cable. The extent of such pulsations and the relative amount of time in which only the dry air or dry nitrogen is passed through the cable may be determined for any given system by experience patterns. If desired, of course, the gas and suspended particles used in the method of my invention may be continuously passed through the cable.

Any chemist having skill in the art can devise a composition which can be aerosolized to form a carrier gas stream and aerosol particles of a dielectric film forming material and a fluorescent dye. Furthermore, anyone having skill in the art can vaporize liquid mixtures to achieve the aerosol particle carrying gas. Thus, a wide variety of aerosolizing equipment is presently commercially available, some of which includes the use of heat, and others of which perform at room temperatures. I prefer for the method of my invention the use of aerosolizing equipment which does not require the use of heat. Suitable equipment useful in the method of my invention is presently commercially available, such as the "Mist-O-Gen" nebulizer manufactured by the Mist-O-Gen Equipment Company of Oakland, California.

In order to illustrate the method of the present invention, four examples are set forth below. However, it is to be understood that the method of the present invention may be practiced with virtually an infinite variety of compositions. As above-indicated, any skilled chemist can devise such compositions, once he is advised as to the goals to be achieved and the method of my invention for achieving them.

*Example 1*

To an underground cable 10 through which dry air is continuously passed from a dehumidifyer refrigeration air compressor 12 at the upstream end to a vacuum pump system 14 at the downstream end, there is periodically added a carrier gas stream from a nebulizer 16 containing aerosolized particles which form a dielectric film on all exposed surfaces, and which contain a fluorescent dye, which fluoresces on exposure to ultraviolet light having a wavelength in the long wave ultraviolet light region.

The carrier gas and aerosol particle mixture used in the method of my invention is prepared by mixing under vigorous agitation 4,590 parts by weight of methyl chloroform, 125 parts by weight of Rhodamine B, 165 parts by weight of sorbitan monooleate, 165 parts by weight of butyl stearate, 90 parts by weight of petrolatum, and 435 parts by weight of mineral oil. This intimate mixture is aerosolized by being passed through a Mist-O-Gen nebulizer and the combination of gas and aerosol particles is injected into the dry air gas stream which is continuously going through the cable.

The methyl chloroform serves as a solvent for the remaining components of the mixture. The Rhodamine B serves as a fluorescent dye. The sorbitan monooleate, butyl stearate, petrolatum and mineral oil form the dielectric film.

In the method of my invention, not only is there a moisture displacement of any moisture within the cable, but moreover there is a simultaneous coating of all surfaces with the dielectric film forming material. Furthermore, leak detection is readily possible since the Rhodamine B will fluoresce upon exposure to ultraviolet light.

As the aerosol particles are in an exceedingly finely divided state, they will insure the coating of the cable with a dielectric film on all surfaces. Furthermore, even pinhole and other obscure leaks may be readily detected.

Where desired, the aforesaid composition may be continuously injected into the air stream. However, in most cases it will be necessary to only pulsate the aforesaid composition into the air stream.

The method of the present invention greatly extends the useful operating life of underground cable, and furthermore enables optimum performance to be achieved throughout such extended operating life. The carrier gas joins with the continuous stream of dry nitrogen or dry air being passed through the cable in displacing residual moisture caused by leaks and/or condensation. Indeed, the presence of surface active materials in the aerosolized particles carried by the carrier gas aids in the displacement of moisture and markedly improves the efficiency of the continuously moving stream of dry nitrogen or dry air in this regard.

*Example II*

The method of Example I is repeated except that in place of the composition used in Example I there is substituted the following composition: 1410 parts by weight of trichloroethylene; 2120 parts by weight of mineral spirits; 125 parts by weight of Rhodamine 6G; 95 parts by weight of sucrose acetate; 60 parts by weight of petrolatum; and 870 parts by weight of mineral oil.

In ths formulation the trichloroethylene and mineral spirits comprise the solvent. The aerosol particles are formed from the Rhodamine 6G, sucrose acetate, petrolatum, and mineral oil. The Rhodamine 6G comprises the fluorescent dye, while the sucrose acetate, petrolatum, and mineral oil combine to make up the dielectric film forming material.

*Example III*

The method of Example I is repeated except that in place of the composition of Example I there is substituted the following composition: 2380 parts by weight of perchloroethylene; 1650 parts by weight of mineral spirits; 160 parts by weight of acrinine orange; 50 parts by weight of phosphonic acid ester; 180 parts by weight of sorbitan monooleate; 150 parts by weight of butyl stearate; and 60 parts by weight of petrolatum.

The perchloroethylene and mineral spirits comprise the solvent, while the acrinine orange comprises the fluorescent dye, and the phosphonic acid ester, sorbitan monooleate, butyl stearate, and petrolatum comprise the dielectric film forming material.

*Example IV*

The method of Example I was repeated except that for the composition used in Example I the following composition was substituted: 2380 parts by weight of butyl alcohol; 125 parts by weight of acrinine orange; 145 parts by weight of sorbitan monooleate; 150 parts by weight of butyl stearate; 35 parts by weight of petrolatum; 870 parts by weight of mineral oil; 36 parts by weight of Santolene C (Santolene C is a fuel oil additive sold by Monsanto Chemical Co., 1700 S. 2nd Street, St. Louis 4, Missouri, and is an oily liquid having a Saybolt viscosity of 250 seconds at 100° F., a flash point of 150° F., and a neutralization number of 84 to 100); and 95 parts by weight of butyl phthalyl butyl glycolate.

The butyl alcohol and to some extent the mineral oil comprises the solvent, the acrinine orange comprises the fluorescent dye, and the sorbitan monooleate, butyl stearate, and the sorbitan monooleate, butyl stearate, petrolatum, mineral oil, Santolene C, and butyl phthalyl butyl glycolate comprise the dielectric film forming material.

The present invention may be embodied in other specific forms without departing from the spirit or essential attributes thereof and, accordingly, reference should be made to the appended claims, rather than to the foregoing specification as indicating the scope of the invention.

I claim:

1. The method for protecting cable encased within a conduit which comprises introducing through said conduit a gaseous stream containing finely divided aerosol particles of a dielectric film forming material, coating the cable with said dielectric film forming material, and displacing moisture from said cable with said gaseous stream.

2. A method in accordance with claim 1 in which the gaseous stream containing finely divided aerosol particles of a dielectric film forming material is introduced into a gas stream which is continuously flowing through said conduit.

3. A method in accordance with claim 2 in which the gas stream containing finely divided aerosol particles is pulsatingly introduced into the gas stream which is continuously flowing through said conduit.

4. The method for protecting cable encased within a conduit which comprises introducing through said conduit a gaseous stream containing finely divided aerosol particles of a fluorescent dielectric material, coating the cable with said fluorescent dielectric material, detecting leaks in said conduit through the observation of said fluorescent dielectric material, and displacing moisture from said cable with said gaseous stream.

5. A method in accordance with claim 4 in which the gaseous stream containing finely divided aerosol particles is introduced into a gas stream which is continuously flowing through said conduit.

6. A method in accordance with claim 5 in which the gaseous stream containing finely divided aerosol particles is pulsatingly introduced into the gas stream which is continuously flowing through the conduit.

References Cited by the Examiner

UNITED STATES PATENTS

| | | | |
|---|---|---|---|
| 590,241 | 9/1897 | Schnaier | 73—40.5 |
| 2,350,759 | 6/1944 | Hilmer et al. | 117—97 XR |
| 2,898,496 | 8/1959 | Clark | 117—97 XR |
| 2,531,156 | 11/1960 | Piercy et al. | 117—95 XR |
| 2,981,982 | 5/1961 | Pendorf | 117—95 XR |

JOSEPH B. SPENCER, *Primary Examiner.*

RICHARD D. NEVIUS, *Examiner.*